(12) United States Patent
Parrish

(10) Patent No.: US 8,488,779 B2
(45) Date of Patent: Jul. 16, 2013

(54) METHOD AND SYSTEM FOR CONDUCTING HIGH SPEED, SYMMETRIC STREAM CIPHER ENCRYPTION

(75) Inventor: David L. Parrish, Earlysville, VA (US)

(73) Assignee: Grey Heron Technologies, LLC, Earlysville, VA (US)

(*) Notice: Subject to any disclaimer, the term of this patent is extended or adjusted under 35 U.S.C. 154(b) by 99 days.

(21) Appl. No.: 13/189,936

(22) Filed: Jul. 25, 2011

(65) Prior Publication Data

US 2013/0028410 A1    Jan. 31, 2013

(51) Int. Cl.
*B41K 3/38* (2006.01)
*H04K 1/00* (2006.01)
*H04K 3/00* (2006.01)

(52) U.S. Cl.
USPC .................................... 380/28; 380/1; 380/59

(58) Field of Classification Search
None
See application file for complete search history.

(56) References Cited

U.S. PATENT DOCUMENTS

| | | |
|---|---|---|
| 1,510,441 A | 9/1924 | Hebern |
| 1,533,252 A | 4/1925 | Koch |
| 1,556,964 A | 4/1925 | Scherbius |
| 1,540,107 A | 6/1925 | Damm |
| 1,683,072 A | 9/1927 | Damm |
| 1,657,411 A | 1/1928 | Scherbius |
| 1,643,546 A | 9/1928 | Hebern |
| 1,861,857 A | 6/1932 | Hebern |
| 2,028,772 A | 1/1936 | Friedman |
| 2,116,733 A | 5/1938 | Noll |
| 2,139,673 A | 12/1938 | Friedman |
| 2,373,890 A | 4/1945 | Hebern |
| 2,402,182 A | 6/1946 | Rosen |
| 2,518,458 A | 8/1950 | Friedman |
| 2,802,047 A | 8/1957 | Hagelin |
| 2,877,565 A | 3/1959 | Friedman |
| 2,884,712 A | 5/1959 | Hagelin |
| 2,917,579 A | 12/1959 | Hagelin |
| 2,984,700 A | 5/1961 | Small |
| 4,156,314 A | 5/1979 | Rosen |
| 6,097,812 A | 8/2000 | Friedman |
| 6,130,946 A | 10/2000 | Friedman |
| 7,236,592 B2 | 6/2007 | Coppersmith et al. |
| 7,814,273 B2 * | 10/2010 | Barrall .......................... 711/165 |
| 7,873,782 B2 * | 1/2011 | Terry et al. ..................... 707/823 |
| 7,921,257 B1 * | 4/2011 | Kleiman et al. .............. 708/531 |
| 2004/0250091 A1 | 12/2004 | Henry et al. |

* cited by examiner

*Primary Examiner* — David Y Jung
(74) *Attorney, Agent, or Firm* — Hunton & Williams LLP

(57) ABSTRACT

A method is provided for processing a digital information set having a plurality of information bytes. The method comprises receiving the information set, determining a set of initialization parameters, initializing a set of state variables using the set of initialization parameters, and generating a plurality of cryptors, each cryptor being a virtual dynamic array containing a monoalphabetic cipher. The method further comprises modifying the state variables and one or more of the cryptors, setting the index value for each cryptor in the plurality of cryptors; and selecting an ordered cryptor subset to be applied to an information byte. The information byte is processed using the ordered cryptor subset to produce a processed information byte. If the information byte is a plaintext byte, the processed byte is an encrypted byte, and vice versa. The actions of modifying, setting, selecting, and processing are then repeated for each remaining information byte.

17 Claims, 13 Drawing Sheets

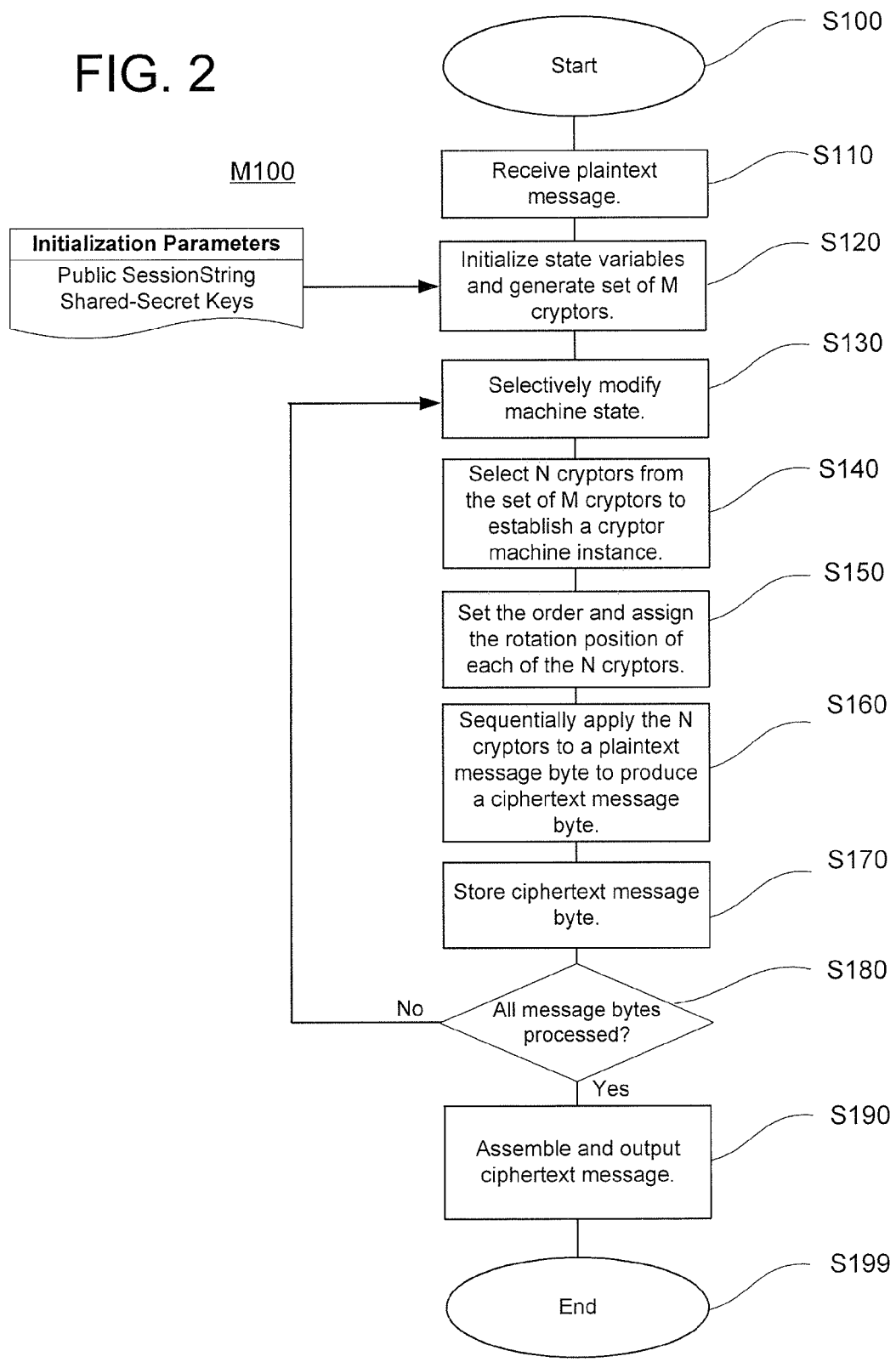

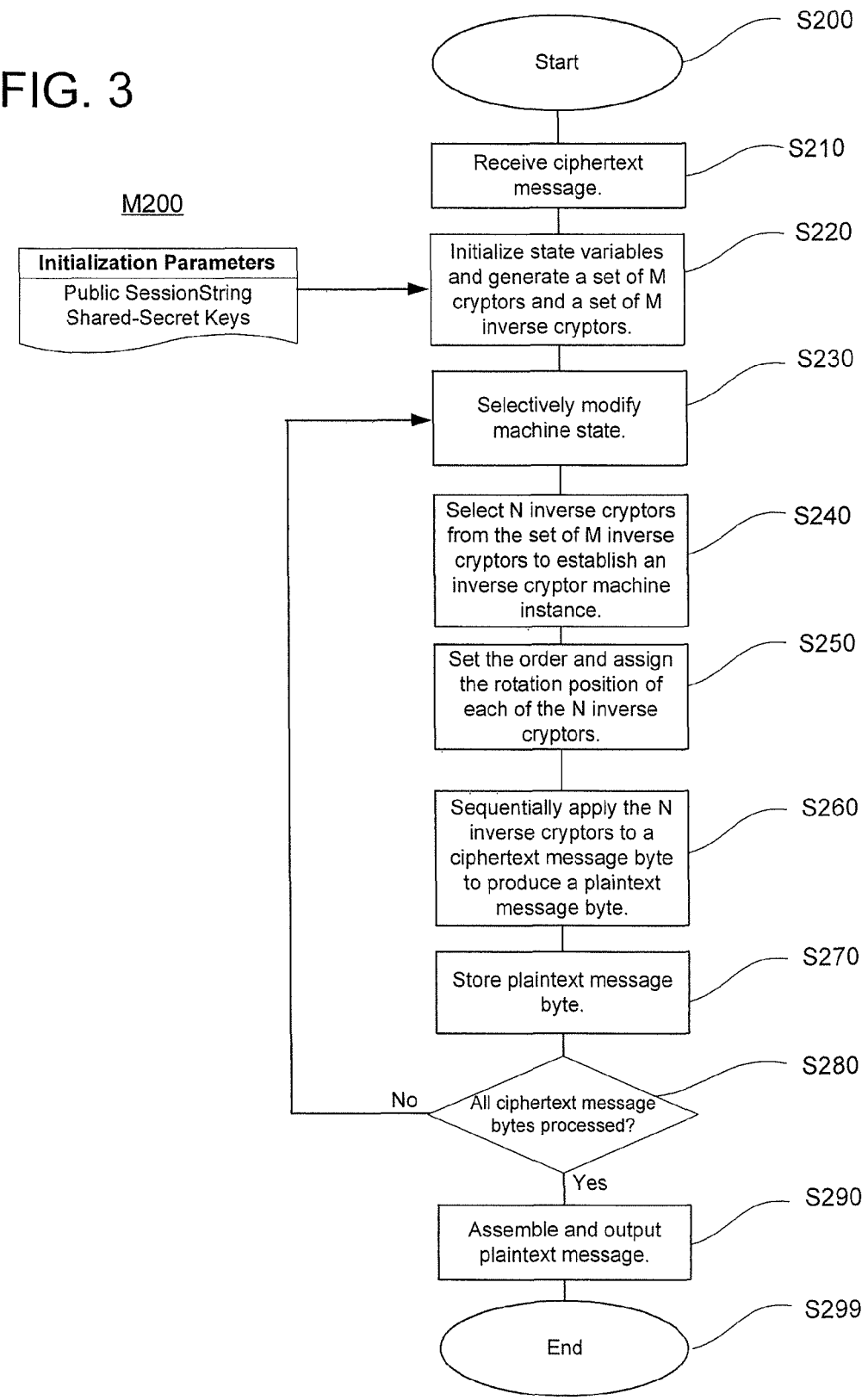

CASE *Variable* OF
    Value(s) Set 1:
        $\left\{\begin{array}{c}\text{Instruction 1}\\ \vdots \\ \text{Instruction N}\end{array}\right\}$ $\vdots$ Value(s) Set N:
        $\left\{\begin{array}{c}\text{Instruction 1}\\ \vdots \\ \text{Instruction N}\end{array}\right\}$
END CASE

FIG. 4

FOR *Variable* ← [Low...High]
    $\left\{\begin{array}{c}\text{Instruction 1}\\ \vdots \\ \text{Instruction N}\end{array}\right\}$

FIG. 5

IF (*Boolean Condition*) THEN
$$\left\{\begin{array}{c} \text{Instruction 1} \\ \vdots \\ \text{Instruction N} \end{array}\right\}$$

FIG. 6

INTERNAL FUNCTION <u>Calculate</u>(Value, Input1, Input2, Input3: Integer)
    Value ← (Input1 ÷ Input2) − Input 3

FIG. 7

```
INTERNAL FUNCTION SwapAll(Target, Guide: Array; Method: Byte)
  LOCAL VARIABLES (PairList: Array; Step: Byte)
    PairList ← Guide
    FOR Step ← [0...127]
      ⎧ CASE (Method ^ 128)  OF
      ⎪     0: ⎡ X ← PairList[Step]
      ⎪        ⎣ Y ← PairList[128 + ((Step + Method) ^ 127)]
      ⎪   128: ⎡ X ← PairList[Step + Step]
      ⎨        ⎣ Y ← PairList[(Step + Step + Method + Method + 1) ^ 255]
      ⎪ END CASE
      ⎪ Z ← Target[X]
      ⎪ Target[X] ← Target[Y]
      ⎩ Target[Y] ← Z
```

FIG. 8

```
INTERNAL FUNCTION BuildCryptor(Entry, Factor: Byte; First, Second: Array)
  LOCAL VARIABLES (Temp: Array; B: Byte)
    FOR B ← [0...255]
      { Temp[First[B]] ← Second[B ⊗ Factor] }
    CryptorTable[Entry] ← Temp
```

FIG. 9

```
INTERNAL FUNCTION BuildInverse(Entry: Byte)
  LOCAL VARIABLES (B: Byte)
    FOR B ← [0...255]
      { InverseTable[Entry][CryptorTable[Entry][B]] ← B }
```

FIG. 10

```
INTERNAL FUNCTION ShiftStates
  IndexLo ← (IndexLo + Inc) ^ 255
  IF (IndexLo = 255) THEN
    { IndexHi ← (IndexHi - Inc) ^ 255
      SwapAll (CryptorTable[IndexHi], CryptorTable[Y], X ⊗ Inc)
      BuildInverse(IndexHi)
      IF (IndexHi = 255) THEN
        { Inc ← (Inc + 2) ^ 255
          BuildCryptor (Inc, Z, CryptorTable[X], CryptorTable[Y])
          BuildInverse(Inc)
          BuildCryptor (Inc - 1, X, CryptorTable[Y], CryptorTable[Z])
          BuildInverse(Inc - 1) }
    }
```

FIG. 11

EXTERNAL FUNCTION Encrypt (Data: Array; Length: Integer)
  LOCAL VARIABLES (Guide, Mask, Positions: Array; B: Byte; N: Integer)
    FOR N ← [0...(Length - 1)]
      ShiftStates
      X ← CryptorTable[IndexHi][IndexLo]
      Guide ← CryptorTable[X]
      Mask ← CryptorTable[Guide[Y]]
      Positions ← CryptorTable[Y]

Y ← Mask[Guide[IndexHi]]
      B ← CryptorTable[Y][(Positions[Y] + IndexLo + Data[N]) ^ 255]
      Y ← Mask[Guide[(IndexHi + 1) ^ 255]]
      B ← CryptorTable[Y][(Positions[Y] + IndexLo + B) ^ 255]
      Y ← Mask[Guide[(IndexHi + 2) ^ 255]]
      B ← CryptorTable[Y][(Positions[Y] + IndexLo + B) ^ 255]
      Z ← Mask[Guide[(IndexHi + 3) ^ 255]]
      B ← CryptorTable[Z][(Positions[Z] + IndexLo + B) ^ 255]
      Z ← Mask[Guide[(IndexHi + 4) ^ 255]]
      Data[N] ← CryptorTable[Z][(Positions[Z] + IndexLo + B) ^ 255]

FIG. 12

```
EXTERNAL FUNCTION Decrypt (Data: Array; Length: Integer)
  LOCAL VARIABLES (Guide, Mask, Positions: Array; B: Byte; N: Integer)
    FOR N ← [0...(Length - 1)]
      ShiftStates
      X ← CryptorTable[IndexHi][IndexLo]
      Guide ← CryptorTable[X]
      Mask ← CryptorTable[Guide[Y]]
      Positions ← CryptorTable[Y]

Y ← Mask[Guide[(IndexHi + 4) ^ 255]]
      B ← ((InverseTable[Y][Data[N]] - IndexLo) - Positions[Y]) ^ 255
      Y ← Mask[Guide[(IndexHi + 3) ^ 255]]
      B ← ((InverseTable[Y][B] - IndexLo) - Positions[Y]) ^ 255
      Y ← Mask[Guide[(IndexHi + 2) ^ 255]]
      B ← ((InverseTable[Y][B] - IndexLo) - Positions[Y]) ^ 255
      Z ← Mask[Guide[(IndexHi + 1) ^ 255]]
      B ← ((InverseTable[Z][B] - IndexLo) - Positions[Z]) ^ 255
      Z ← Mask[Guide[IndexHi]]
      Data[N] ← ((InverseTable[Z][B] - IndexLo) - Positions[Z]) ^ 255
```

FIG. 13

```
INTERNAL FUNCTION ApplyPrivateKey (PrivateKey: Array)
  LOCAL VARIABLES (B, N: Byte)
    FOR B ← [0...31]
      ⎧ FOR N ← [0...255]
      ⎨   ⎧ SwapAll(CryptorTable[N], CryptorTable[PrivateKey[B]], N) ⎫
      ⎩   ⎩ SwapAll(CryptorTable[255 - N], CryptorTable[PrivateKey[B]], Z) ⎭
```

FIG. 14

```
INTERNAL FUNCTION ApplySessionString(TempSession: Array)
  LOCAL VARIABLES (B, N: Byte)
    FOR N ← [0...255]
      ⎧ B ← N ^ 63
      ⎪ IF (B = 0) THEN
      ⎨    { Encrypt(TempSession, 64) }
      ⎪ SwapAll(CryptorTable[N], CryptorTable[TempSession[B]], Y)
      ⎩ SwapAll(CryptorTable[255 - N], CryptorTable[TempSession[63 - B]], X)
```

FIG. 15

```
INTERNAL FUNCTION MorphAllCryptors
  LOCAL VARIABLES (Temp: Array; N: Byte)
    FOR N ← [0...255]
      ⎧ Temp ← CryptorTable[255 - N]
      ⎪ Encrypt(Temp, 256)
      ⎨ SwapAll(CryptorTable[N], Temp, Z)
      ⎩ SwapAll(CryptorTable[255 - N], CryptorTable[N], X)
```

FIG. 16

EXTERNAL FUNCTION ModifySession(*SessionString*, *PrivateKey*, Order: Array)
  LOCAL VARIABLES (Temp, TempSession: Array; N: Byte)

TempSession ← *SessionString*
  Encrypt(TempSession, 64)
  FOR N ← [0...255]
    { Encrypt(TempSession, TempSession[N ^ 63] ^ 63)
      SwapAll(*CryptorTable*[Order[N]], *CryptorTable*[*Y*], TempSession[N ^ 63]) }

Temp ← *CryptorTable*[*IndexLo*]
  FOR N ← [0...255]
    { SwapAll(Temp, *CryptorTable*[*X*], Order[*Y*])
      BuildCryptor(N, Order[N], Temp, *CryptorTable*[255 - N]) }

ApplyPrivateKey(*PrivateKey*)
  ApplySessionString(TempSession)
  MorphAllCryptors
  FOR N ← [0...255]
    { BuildInverse(N) }

FIG. 17

EXTERNAL FUNCTION NewSession(*SessionString*, *PrivateKey*, *BaseKeys*: Array)
  LOCAL VARIABLES (Temp, TempSession: Array)

*CryptorTable* ← *BaseKeys*
  ApplyPrivateKey(*PrivateKey*)

*IndexLo* ← *X*
  *IndexHi* ← *Y*
  *Inc* ← (Z ^ 254) + 1

TempSession ← *SessionString*
  ApplySessionString(TempSession)
  MorphAllCryptors BuildCryptor(*IndexHi*, *IndexLo*, *CryptorTable*[*X*], *CryptorTable*[*Y*])
  Temp ← *CryptorTable*[*IndexHi*]
  ModifySession(TempSession, *PrivateKey*, Temp)

FIG. 18

METHOD AND SYSTEM FOR CONDUCTING HIGH SPEED, SYMMETRIC STREAM CIPHER ENCRYPTION

FIELD OF THE INVENTION

The field of the present invention relates generally to the science of cryptography, and more particularly to symmetric stream cipher systems and methods for encrypting and decrypting digital data. The present invention may generally be used to encrypt and decrypt information to protect data transmitted through communication systems or stored on a device such as a computer disk drive.

BACKGROUND

Several classes of cryptography algorithms are currently used to encrypt and decrypt data. Two classes of algorithms generally include symmetric key and asymmetric key (public key) algorithms. In asymmetric, or public key, cryptography, the key used to encrypt a message is not the same as the key used to decrypt it. The encryption key is public and widely distributed, and the decryption key is private and known only to the authorized recipient of the message. Public key algorithms, however, are very computationally intensive and the encryption and decryption operations are slow even on small amounts of data. Symmetric key algorithms, on the other hand, can be executed much faster while providing commensurate and even stronger levels of cryptographic security.

There are currently three prevailing published symmetric key algorithms: the Data Encryption Standard (DES), triple DES, and the Advanced Encryption Standard (AES). Each of these symmetric key algorithms divides plaintext and ciphertext into blocks of a specified size for encryption and decryption. This is known as a block cipher and generally involves operations on blocks of digits with a fixed, unvarying transformation. These algorithms are related in that each utilizes the same type of sub-operations to encrypt a block of plaintext into a block of ciphertext, and the same type of inverse sub-operations to decrypt a block of ciphertext into a block of plaintext. Block cipher algorithms have inherent limitations, however, which include slower execution speeds than stream ciphers (discussed below) and require more hardware complexity. Further, messages that do not match the block size (e.g. 128 bits) require the generation of padding text to complete the block. Additionally, block cipher algorithms encrypt identical blocks of plaintext into identical blocks of ciphertext using the same key.

Stream ciphers, on the other hand, encrypt the bits or bytes of a message one at a time, rather than in blocks as in block ciphers, and ideally do not encrypt identical plaintext into identical ciphertext. Further, stream ciphers typically execute at a higher speed than block ciphers and require lower hardware complexity, and can therefore be used in smaller applications, such as on mobile phones.

Certain aspects of the present invention relate to the stream cipher concepts designed and developed for use in rotor machines, electro-mechanical polyalphabetic devices that produced periodic sequences of monoalphabetic ciphers, each of which were used to encrypt a character of plaintext. Rotor machines were the standard cryptographic instruments adopted for military use by the Allied and German forces in the years before and during World War II. However, history records that most adversaries were generally successful at breaking enemy ciphers generated by such machines, mainly due to the methods adopted for regular stepping of one or more codewheels to new rotational positions before each character was encrypted, as well as flaws in the procedures for field operation and operator errors.

Rotor machines of this type were originally invented and patented by Edward H. Hebern. Improved versions were subsequently patented and made famous by Arthur Scherbius (e.g., ENIGMA) and later by Boris C. W. Hagelin (e.g., the eM209 and M211 machines), William Frederick Friedman (e.g., the Converter M-134-C, M-228, and M-325 machines), Laurence Safford and Seiler (the ECM Mark 11 machine, a.k.a. SIGBA) and others, including the TSEC/KL-7 (code named ADONIS) used by the National Security Agency into the 1970s.

The fundamental principle supporting each of these rotor machines is the serial application of a set of rotatable codewheels, each encrypting an input character via a monoalphabetic cipher to an output character that is then used as an input to the next codewheel in the sequence. Each intermediate encryption result in the sequence is affected by the rotational position of the corresponding codewheel. The initial input value is the plaintext byte and the final output value is the ciphertext byte. The state of the machine is then modified by the automatic rotation of one or more of the codewheels to a new position and the next character is then encrypted. Some rotor machines had additional features, such as a plugboard that supported a number of cables with jacks that switched pairs of various input plaintext values in an effort to thwart cryptanalysis attacks.

A codewheel was typically a circular wheel made of bakelite or ceramic material with wiring that mapped each input contact to a different output contact, establishing a single monoalphabetic cipher. Each codewheel could be rotated in these machines to as many positions as there were members in the plaintext alphabet, each different position producing a different ciphertext output character for the same plaintext input character. Consequently, for an alphabet size of 26 ($\alpha$=26), each codewheel logically represented 26 different monoalphabetic ciphers as determined by its position. Even assuming an alphabet size of only 26, rotor machines supporting four codewheels ($\phi$=4) generated approximately 450,000 (i.e., $26^4$) different monoalphabetic ciphers before repeating an encryption with the same position of all codewheels. Later rotor machines, supporting six such codewheels ($\phi$=6), had a cycle of approximately 309,000,000 (i.e., $26^6$) monoalphabetic ciphers. Increasing either the size of the alphabet ($\alpha$) or the number of codewheels ($\phi$) expands the periodic cycle dramatically. For instance, the Soviet Union used a rotor machine with 10 codewheels each having a monoalphabetic cipher of 30 Cyrillic characters ($\alpha$=30; $\phi$=10), yielding approximately 590 trillion different monoalphabetic ciphers (i.e., $30^{10}$).

Regardless of the number of codewheels employed, conventional rotor machines were still subject to cryptanalysis attack. Successful cryptanalysis methods and strategies involved deriving statistical information about the structure and content of individual codewheels employed during the encryption sessions as well as the stepping algorithm that systematically drove the rotor machine to the next state. Since multiple codewheels were supplied which could be mounted in various combinations, order, and positions, the cryptanalysis efforts required to break the ciphertext produced by such machines was immense, particularly before the advent of modern computing and networked supercomputers. Even today, many historical messages enciphered by such rotor machines have yet to be deciphered simply because the available message traffic for particular sets of codewheels is too small for cryptanalysis to yield meaningful results.

In general, such prior art rotor machines were constructed with a "reflector" rotor that guided electronic impulses back through the set of rotors such that the ciphertext generated by each character of the alphabet was pair-wise symmetric. That is, in any given state, if encryption of the letter B produced the ciphertext letter X, then encryption of the letter X produced the ciphertext letter B. Thus, a rotor machine initialized in the same state could be used for either encryption of plaintext or decryption of ciphertext. While this strategy greatly simplifies operations by eliminating additional equipment and procedures, it introduces significant cryptanalysis vulnerabilities.

Furthermore, conventional rotor machines had major operational drawbacks in that they required costly and complex procedural efforts to provide operational support. Multiple sets of identical codewheels had to be constructed in secret and protectively distributed to authorized parties, and their introduction into operation had to be carefully coordinated. Many such sets were used for months, even years, due to the effort required to initiate new sets. Detailed operational instructions were necessary, directing painstakingly meticulous steps to ensure that the exact setup and initialization process for each base session was absolutely correct since any deviation resulted in unintelligible ciphertext even to authorized recipients. Usually these setup instructions changed daily, thus adding to the complexity. A typical operational procedure required the following steps to produce each daily base session:

A container with the correct set of codewheels was selected;
  an exact subset of 4, 5 or 6 codewheels was extracted from the container;
  the selected subset of codewheels was mounted into the machine in a specific order;
  each mounted codewheel was adjusted to a specific position; and
  cables were then connected to specific pairs of plugboard jacks.

Once the daily base session settings were established, each encrypted message was usually preceded with directions specifying minor changes made to the base session settings prior to the encryption of the associated message. For example, one or more rotors might be adjusted to a different rotational position.

Another significant issue was the manpower required for communications security. Thoroughly trained operators were absolutely essential for successful, secure communications using conventional rotor machines, and military forces had special attachments dedicated to such efforts. Multiple operators were assigned to oversee each session initiation and operation in an effort to avoid incorrect setups. Still, history reveals that during extended periods of operations, errors were unavoidable, many of them contributing to successful cryptanalysis efforts by adversaries. For example, some messages were transmitted that had been accidentally encrypted with the wrong settings, and then immediately retransmitted after being correctly encrypted using slightly different settings—a serious cryptographic mistake. Also, some procedures actually required duplicating portions of encrypted message headers, creating another serious vulnerability.

Early rotor machines utilized a regular odometer-like stepping algorithm for repositioning codewheels, which is a critical design flaw due to the fact that if each letter of the alphabet is processed while a number of codewheels are held fixed in their respective positions, the cryptographic effect produced by the fixed set is identical to that produced by a single monoalphabetic cipher. Thus, sequentially advancing the first codewheel until a full revolution occurs, then stepping the second codewheel, and resuming stepping of the first, is actually equivalent to having only two codewheels in use for a period determined by the size of the alphabet.

Later rotor machines addressed this vulnerability by introducing more complex and irregular stepping methods that made cryptanalysis much more difficult. One such example is the aforementioned TSEC/KL-7 that introduced two additional banks of secondary codewheels whose sole purpose was to produce a variable stepping sequence for the primary codewheels of the rotor machine. The TSEC/KL-7, however, was still subject to the other disadvantages of conventional, physical rotor machines, such as the complex procedures and operational support that were required for such devices. Even with the TSEC/KL-7, the cryptographic protection produced by such conventional rotor machines was basically generated by varying the initial installation, ordering, and positioning of a group of fixed codewheels selected from a relatively small, distributed set, and devising irregular methods of rotating the codewheels as encryption proceeded.

Many of these prior art rotor machines have now been implemented as software computer applications that exactly mimic their performance. However, such applications are merely simulations of prior art rotor machines. No instance of an improved virtual rotor machine has been publicly disclosed.

SUMMARY OF THE INVENTION

An aspect of the present invention provides a method for processing a digital information set having a plurality of information bytes. The method comprises receiving the information set, determining a set of initialization parameters, initializing a set of state variables using the set of initialization parameters, and generating a plurality of cryptors, each cryptor being a virtual dynamic array containing a monoalphabetic cipher and having an associated index value representing a rotational position of the cryptor. The method further comprises modifying the state variables and one or more of the plurality of cryptors, setting the index value for each cryptor in the plurality of cryptors; and selecting an ordered cryptor subset to be applied to an information byte. The selected one of the plurality of information bytes is processed using the ordered cryptor subset to produce a processed information byte. The actions of modifying, setting, selecting, and processing are repeated for each remaining information byte of the information set, each performance cycle of the actions of modifying, setting, selecting, and processing constituting a process iteration. The method also comprises assembling the processed information bytes from all process iterations to form an output information set.

Other aspects and advantages of the invention will become apparent from the following descriptions which, taken in conjunction with the accompanying drawings, illustrate the principles of the invention by way of example.

BRIEF DESCRIPTION OF THE DRAWINGS

FIG. 2 is a block diagram of an encryption method according to an embodiment of the invention;

FIG. 3 is a block diagram of a decryption method according to an embodiment of the invention;

FIG. 4 shows the basic construct of a CASE statement in PASCAL;

FIG. 5 shows the basic construct of a FOR statement in PASCAL;

FIG. 6 shows the basic construct of an IF . . . THEN statement in PASCAL;

FIG. 7 shows an example PASCAL function Calculate that illustrates the functional definitions used in subsequent figures;

FIG. 8 shows a SwapAll function that illustrates a method of modifying the contents of a cryptor according to an embodiment of the invention;

FIG. 9 shows a BuildCryptor function that illustrates a method of generating the contents of a cryptor according to an embodiment of the invention;

FIG. 10 shows a BuildInverse function that illustrates a method which, for any given cryptor, builds an inverse cryptor containing the unique monoalphabetic cipher which exactly reverses the encryption affects of the cryptor according to an embodiment of the invention;

FIG. 11 shows a ShiftStates function that illustrates a method for unpredictably modifying the internal states of the stream cipher of the invention according to an embodiment of the invention;

FIG. 12 shows an Encrypt function that illustrates a method of encrypting plaintext data bytes according to an embodiment of the invention;

FIG. 13 shows a Decrypt function that illustrates a method of decrypting ciphertext data bytes according to an embodiment of the invention;

FIG. 14 shows a ApplyPrivateKey function that illustrates a first exemplary method of modifying the monoalphabetic cipher contents of every cryptor in the large plurality of cryptors during initialization of the stream cipher according to an embodiment of the invention;

FIG. 15 shows an ApplySessionString function that illustrates a second exemplary method of modifying the monoalphabetic cipher contents of every cryptor in the large plurality of cryptors during initialization of the stream cipher according to an embodiment of the invention;

FIG. 16 shows a MorphAllCryptors function that illustrates a third exemplary method of modifying the monoalphabetic cipher contents of every cryptor in the large plurality of cryptors during initialization of the stream cipher according to an embodiment of the invention;

FIG. 17 shows a ModifySession function that illustrates an exemplary method of wholly modifying all current internal states of the stream cipher of the invention according to an embodiment of the invention;

FIG. 18 shows a NewSession function that illustrates an exemplary method of generating all initial internal states of the stream cipher of the invention, including the large plurality of cryptors and the corresponding plurality of inverse cryptors, according to an embodiment of the invention;

DETAILED DESCRIPTION OF THE INVENTION

Figure 1:
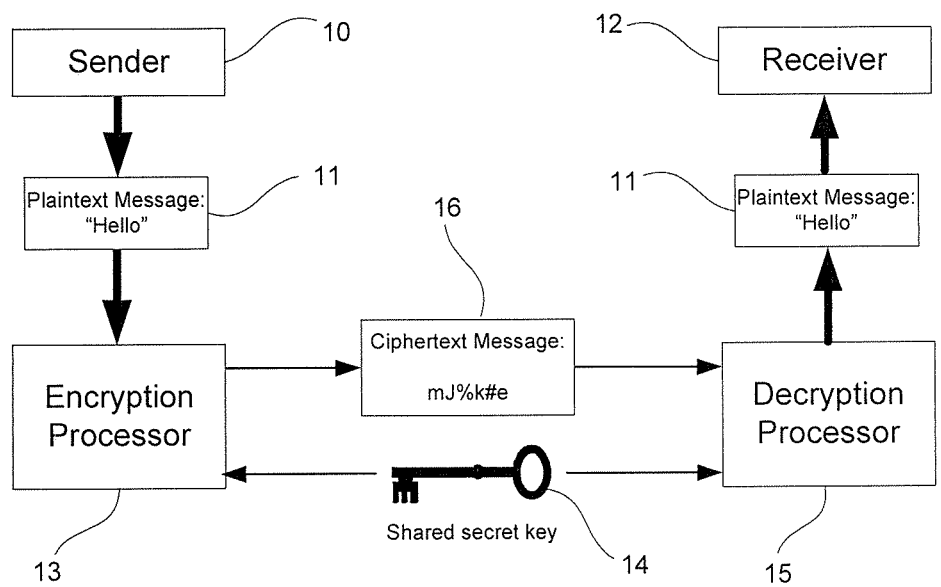
FIG. 1 is a block diagram illustrating a generic symmetric-key encryption process.

The present invention introduces innovative strategies and concepts that revolutionize encryption technology based on the concepts of traditional rotor machines. Such machines, and their computer-simulated counterparts, use various stepping algorithms to rotationally reposition a small set of static codewheels mounted in a fixed relative order to produce periodic sequences of monoalphabetic ciphers used to encrypt plaintext bytes. In stark contrast, the stream cipher of the present invention effectively constitutes a virtual polymorphic chamber that pseudo-randomly generates essentially aperiodic sequences of virtual dynamic rotor machines, each used to encrypt only a single plaintext byte. This polymorphic chamber is comprised of a large plurality of dynamic codewheels (referred to herein as "cryptors") whose monoalphabetic cipher contents are constantly subject to unpredictable alterations prior to each process iteration. Then, for each process iteration, a subset of the current large plurality of cryptors is pseudo-randomly selected, ordered, and rotationally positioned within a virtual "cryptor machine" to encrypt the next plaintext byte. The once-used cryptor machine is then logically discarded before the next process iteration. Using such polymorphic cryptors instead of fixed configuration codewheels, the stream cipher of the present invention eliminates all static aspects of conventional rotor machines, constituting a major sea-change to this technology.

It will be understood that the embodiments of the invention are described using various terms (e.g., rotor or codewheel) relating to cryptographic rotor machines. As used herein, such terms may refer not only to the components of mechanical rotor machines but also to analogous components of virtual rotor machines operating on or through the use of a computer or other data processor. In that regard, embodiments of the stream cipher methods disclosed herein may be executed on a machine which may be a programmable or pre-programmed digital computer or an application-specific dedicated device.

Operating, for example, on a computing device or implemented within one or more dedicated processors, the methods disclosed herein are extremely efficient and are capable of providing data encryption at speeds sufficient to support the demands of modern network communications. The process is also scalable, allowing multiple independent instances of the invention, driven by separate processors, to be created and coordinated, linearly increasing throughput with each additional instance. Such an approach further increases the overwhelming cryptanalysis challenge presented by only a single instance of the invention.

The exemplary methods of the invention illustrated herein repeatedly generate virtual cryptor machine instances, each assembled using a subset of different cryptors selected from a large plurality of cryptors. The varying configurations of these virtual cryptor machine instances are determined by the exemplary methods using a set of variables that are referred to herein as the machine's internal state variables and are referenced throughout the illustrative functions that specify the initialization, encryption, and decryption processes.

Aspects of the present invention pseudo-randomly allow for, inter alia, the simulated intermittent rotation (i.e. changing of an associated index or offset value) of all cryptors, continual variation of the selected subset of different cryptors as well as the order in which they are applied, and the progressive, pseudo-random modification and regeneration of the monoalphabetic content of all cryptors. Furthermore, as part of the initialization of every encryption session, the large plurality of initially installed cryptors are pseudo-randomly generated rather than merely pseudo-randomly selected and ordered from a pre-existing distributed set. Every installed cryptor may be generated using one or more shared-secret parameters to correctly interpret extremely detailed instructions contained within a string of byte values, referred to herein as a "sessionstring." Such sessionstrings may be publicly exchanged by cooperating parties prior to the initialization of each encryption session. The exemplary embodiment of the invention illustrates methods that ensure that even a single bit variation in such a sessionstring, or anywhere within the set of shared-secret parameters, results in wholesale changes to each and every cryptor generated during initialization.

The present invention is extremely efficient and allows for high-speed encryption of digital data sufficient to support modern networks. During such high-speed encryption sessions, the monoalphabetic cipher within each cryptor may have a life expectancy of only a few milliseconds. In an illustrative embodiment of the invention, every cryptor is wholly and unpredictably altered within every full cycle of 65,536 encryption iterations by pseudo-random pair-wise exchanges that alter the location of every value in the monoalphabetic cipher. Further, after 65,536 cycles, every cryptor has been completely replaced with the factored product of two pseudo-randomly selected cryptors.

As noted above, the stream cipher of the present invention generates essentially aperiodic sequences of virtual cryptor machines, each such machine being used to encrypt only a single plaintext byte. Each generated virtual cryptor machine is pseudo-randomly constructed by selecting, ordering, and rotationally positioning each member of a relatively small subset chosen from a larger set of dynamic, polymorphic codewheels ("cryptors"). Unlike the prior-art codewheels that contained fixed monoalphabetic ciphers, the polymorphic cryptors of the disclosed invention are totally dynamic. Every cryptor of the stream cipher of the invention may be unpredictably and repeatedly subjected to wholesale modifications ("morphings") that alter the location of values within its monoalphabetic cipher. Each such morphing dramatically alters not only the individual cryptor, but also directly impacts the set of potential virtual cryptor machines that may subsequently be constructed to encrypt plaintext bytes, as well as significantly altering the effects produced by subsequent morphings.

The invention also allows expansion of the plaintext alphabet to include, for example, all 256 values {0 . . . 255} that may be represented in a digital data byte having eight binary bits. As will become evident, the entropy introduced by expanding the alphabet to include values not used by most plaintext introduces no significant cryptanalysis vulnerabilities. An enlarged alphabet not only allows for encryption of all digital data, it also produces a non-linear increase in the total number of unique monoalphabetic ciphers (256 factorial for a 256 value alphabet), any of which may be contained within a cryptor. Further, an enlarged alphabet exponentially increases the number of alternative rotational positions of the subset of cryptors selected for each virtual cryptor machine instance.

Another significant innovation of the invention is that each cryptor may be pseudo-randomly regenerated and/or unpredictably altered by one or more pair-wise exchanges of the monoalphabetic cipher contents of the cryptor. This innovation is referred to herein as cryptor morphing. The new cryptor produced by each such morphing can be used to significantly alter the set of possible results of all subsequent morphings. While morphing can be accomplished by any of a wide variety of techniques, two particularly effective strategies are described below.

Another innovation of the invention is the introduction of a variable stepping process that exploits the dynamic nature of the large set of cryptors, using their combined, continually changing monoalphabetic cipher contents as a source for unpredictable sequences of values. These sequences are produced by stepping index values through different periodic cycles, each referencing every byte value within the large plurality of continually changing cryptors. The invention uses the pseudo-random values produced by these cycles of sequences to direct various tasks performed for each encryption iteration.

Yet another noteworthy innovation of the present invention is the introduction in some embodiments of a separate decryption process that perfectly reverses the effects of the encryption process using a set of inverse cryptors, entirely eliminating the use of a "reflector" and the associated vulnerabilities. The fact that the stream cipher of the invention might encrypt the plaintext letter B into the ciphertext letter X imposes absolutely no requirement that the ciphertext letter B be produced by encrypting the plaintext letter X in the same state. The invention constantly maintains a unique set of inverse cryptors that exactly correspond to the current set of cryptors, each inverse cryptor containing the unique monoalphabetic cipher that exactly reverses the effects of encryption by the corresponding cryptor for each character of the plaintext alphabet.

In an alternative embodiment, the method of the invention may be configured so that a separate decryption process is not required. In this embodiment, a target byte is pseudo-randomly selected and encrypted using the selected subset of cryptors. The encrypted target byte is then applied to a plaintext byte of the message to be encrypted using a Boolean exclusive-or operator (or other appropriate mathematical operation) to produce a ciphertext byte. A new target byte is then pseudo-randomly selected, encrypted and applied to the next message byte, until the entire message has been encrypted. A message encrypted using this approach may be decrypted by passing the encrypted message through the same encryption process using the same initialization parameters. The only difference is that this time, the input message is a ciphertext message, which when processed according to the same method as the original plaintext message will result in the exact reproduction of the plaintext message.

Aspects of the present invention will now be discussed in more detail.

An illustrative aspect of the stream cipher of the disclosed invention provides a computer-implemented method for encrypting and decrypting plaintext information sets having a plurality of information bytes. The encryption method of the invention is carried out by first initializing the internal state variables of the encryption device. This may be done, for example, using a public information string and a private information string, as is discussed in more detail below. The encryption method then pseudo-randomly performs the tasks of modifying the set of internal state variables and, based on the new set of state variables, selecting an ordered subset of, for example, 5 different cryptors from a large plurality of cryptors, assigning each selected cryptor in the subset a rotational position, and then constructing a virtual cryptor machine by installing the selected cryptors in the order of selection and adjusting each cryptor in the rotor machine to its assigned rotational position. The encryption method further comprises sequentially applying each of the cryptors in the virtual rotor machine in order, using their pre-adjusted positions to encrypt the plaintext information byte. The processed result from the application of each cryptor is used as the input byte for the next cryptor in the sequence. The processed result from application of the final cryptor is the final encrypted information byte. Each complete performance of the pseudo-random tasks of modifying, selecting, assigning, constructing, installing adjusting, and sequentially applying, constitutes an encryption iteration, which is performed for each plaintext information byte of the information set. The encryption method further comprises assembling the encrypted information bytes from all encryption iterations to form the ciphertext output information set.

In some embodiments, a decryption method of the invention may be carried out by initializing the internal state variables of the invention using the same public information string and private information string that was used to initialize the corresponding encryption session, generating an additional large plurality of inverse cryptors, each of which contains the unique inverse monoalphabetic cipher of the corresponding cryptor in the large plurality of cryptors. The decryption method then pseudo-randomly performs the tasks of modifying the set of internal state variables and, based on the new set of state variables, selecting the subset of 5 inverse cryptors from the large plurality of inverse cryptors that correspond with the subset of cryptors selected from the large plurality of cryptors during the encryption process, assigning each inverse cryptor in the subset the same rotational position used to pre-adjust each cryptor during encryption, and constructing a virtual inverse cryptor machine by installing each of the selected inverse cryptors in the reverse order of selection with no rotational adjustment. The decryption method further comprises the tasks of sequentially applying each inverse cryptor in the virtual inverse cryptor machine, post-adjusting the intermediate result from each inverse cryptor with its assigned rotational position, the resulting value being used as the input byte to the next inverse cryptor in the sequence, the post adjusted results of the final inverse cryptor yielding the unencrypted plaintext information byte. Each complete performance of the tasks of pseudo-randomly modifying, selecting, assigning, constructing, installing, sequentially applying and post-adjusting, constitutes a decryption iteration, which is performed for each ciphertext information byte of the information set. The decryption method further comprises assembling the decrypted information bytes from all decryption iterations to form the plaintext output information set.

In the exemplary embodiment, the polymorphic chamber of the stream cipher of the invention contains a transitory set of 256 cryptors from which a subset of 5 different cryptors are pseudo-randomly selected, ordered, and rotationally positioned to construct a virtual cryptor machine instance for each encryption iteration. Thus, each virtual cryptor machine instance may contain any one of the possible 1,057,145,886,720 (the product: 256×255×254×253×252) unique, ordered subsets of 5 different cryptors. Further, a different rotational position may be independently assigned to each of the 5 cryptors in the virtual cryptor machine, allowing exactly 1,057,145,886,720 different positional possibilities for every virtual cryptor machine instance so constructed, each different set of positions producing a different monoalphabetic cipher with which to encrypt the single plaintext byte. These two values are therefore multiplicative, resulting in the exemplary embodiment of the invention choosing from among more than $10^{24}$ different possible monoalphabetic ciphers to encrypt each plaintext character. Further, this huge set of possible alternatives is wholly transitory across process iterations since the polymorphic chamber is in a constant state of flux.

If desired, it is a simple exercise to anyone skilled in the art to increase the size of the subset selected to build such virtual cryptor machines. For example, selecting a subset of six cryptors increases the $10^{24}$ number of possible alternative monoalphabetic ciphers by a multiplicative factor of 63,001 (251×251) with only a small percentage increase in processing costs. Similarly, an increase to eight cryptors in each virtual cryptor machine instance would result in exponentially increasing the number of possible monoalphabetic ciphers to considerably more than $10^{38}$ alternatives, with only a corresponding linear percentage increase in processing costs.

Any or all of the internal state variables of the exemplary embodiment of the stream cipher of the invention may be modified prior to the encryption of each byte of plaintext. Ultimately, the entire set of values within the polymorphic chamber of the stream cipher is modified for every full cycle of 65,536 encryption iterations.

The state modifications performed prior to the encryption of each plaintext byte dramatically alter the monoalphabetic cipher of a different cryptor using the first of two exemplary innovative morphing strategies once every 256 iterations. After every full cycle of 65,536 iterations, all cryptors have been similarly modified ensuring that the location of every value in every cryptor has been changed. Additionally, after every 65,536 iterations, two cryptors may be pseudo-randomly regenerated by the second exemplary innovative morphing strategy, ultimately regenerating all cryptors within every 8,388,608 iterations. These changes dramatically affect the sequences of pseudo-random values that direct the processes of the invention, the rotational positions of the cryptors used to encrypt each plaintext byte, and the more than one trillion alternative cryptor machines that are candidates for construction during subsequent encryption iterations.

The stream cipher system of the present invention greatly enhances security over that of typical block cipher systems which always encrypt identical plaintext blocks into identical ciphertext blocks using the same key, creating cryptographic vulnerabilities. Additionally, the stream cipher system of the present invention is computationally fast relative to systems based on public key algorithms. Finally, in the exemplary embodiment, the inverse decryption logic uses a step-by-step process that mirrors the encryption process using a set of inverse cryptors to reverse the effects of encryption. The decryption process involves the initial generation of the set of inverse cryptors and reconstruction of the corresponding inverse cryptor whenever a cryptor is modified or replaced.

For purposes of illustration, FIG. 1 shows a general symmetric-key encryption process. In symmetric-key cryptography, a sender 10 is able to securely send a plaintext message 11 to a receiver 12. The sender 10 and receiver 12 share a private key 14, which is used by an encryption processor 13 to encrypt the plaintext message 11 into ciphertext 16. The private key 14 is also used by a decryption processor 15 to decrypt the ciphertext 16 and reproduce the plaintext message 11.

In general, symmetric stream cipher systems may use one or more shared-secret keys in combination with an additional, generated initial value to establish protected communication sessions using a relatively simple strategy or protocol. For example, a shared-secret key, known only by the communicating entities, is used by each entity only to create encryption sessions to protect communications with the other. The communicating entities typically recognize each other using previously agreed upon unique identities. Either entity wishing to establish protected communications with another entity first pseudo-randomly generates an initial value. This first entity then inputs the initial value and the shared-secret key into a stream cipher initialization function to create an initial machine state that will be used by the first entity to encrypt plaintext to produce ciphertext. The first entity then transmits his unique identifier and the initial value, unencrypted, over a communication channel to the second entity.

Upon receipt of this communication, the second entity, recognizing the identifier, inputs the shared-secret key associated with the first entity and the received initial value into the initialization function of the same stream cipher initialization function to create an identical initial machine state, allowing the second entity to decrypt ciphertext subsequently received from the first entity into plaintext. The second entity then repeats the process by pseudo-randomly generating a separate initial value used with the shared-secret key to create a different stream cipher session that will subsequently be used to encrypt messages sent to the first entity. The second entity then transmits the unencrypted initial value to the first entity, which is then able to create the exact same session for decrypting ciphertext subsequently received from the second entity. Once the two separate sessions have been successfully created by both entities, protected communications may be used to exchange encrypted challenges and responses that assure each entity that the other has successfully established the correct decryption session, a secure dual-authentication protocol.

More sophisticated strategies would use such initial stream cipher sessions only to protect the exchange of additionally generated temporary information values that are then used to create two secondary sessions using entirely different input parameters to the stream cipher initialization function. The initial sessions are then closed and the secondary sessions are used to protect all subsequent communications. The purpose of such strategies is to ensure that any session created using a shared-secret key with a publicly exchanged initial value is never used to encrypt plaintext whose content is subject to frequency analysis.

FIG. 2 illustrates a generalized method M100 of encrypting a message according to an embodiment of the invention. The method begins at S100 and at S110 a plaintext message to be processed is received. At S120, an encryption session is created by initializing the internal state variables based on a set of initialization parameters. These initialization parameters may be established using a sessionstring and shared-secret keys as described above. A set of cryptors having M members is then generated. The initialization function is designed to establish the entire set of internal state variables, including the cryptors, in an unpredictable manner.

The number of cryptors, M, is essentially unrestricted. In an illustrative configuration that will be used in the examples presented herein, M=256, meaning the system uses a set of 256 cryptors. For computation purposes, the cryptors may be contained in a cryptor table having M members. At S130, the machine state may be selectively modified, potentially changing the rotational positions of some or all of the M cryptors and/or the monoalphabetic cipher contents of one or more of the M cryptors. As used herein, the term "rotational position" is used to refer to the computational analog (such as an associated index or offset value) of the rotational orientation of a mechanical codewheel, which determines the output character produced for any given input character. At S140 a subset of cryptors having N members is selected from the overall set of M cryptors to build an instance of a virtual cryptor machine. As will be discussed, virtually any methodology may be used to select the members of this cryptor subset, as would be understood by one of ordinary skill in the art.

At S150 the N cryptors are installed in the virtual cryptor machine in the order selected and each is set to its assigned rotational position. The assigned rotational position may be the rotational position previously assigned to the cryptor or a newly determined position. At S160, all N cryptors in the virtual cryptor machine are sequentially applied in the order installed to encrypt the plaintext byte. At S170, the encrypted data byte is stored as the next ciphertext byte. At S180, a determination is made as to whether all of the message bytes have been processed. If additional message bytes remain to be processed, the method returns to S130, a new machine state is established and actions S140-S180 are repeated. If, at S180, it is determined that all plaintext bytes of the received message have been encrypted, the ciphertext message is output at S190 and the method ends at S199.

The number of cryptors selected, N, may vary in different embodiments. In the examples used herein, N=5, meaning that 5 cryptors are sequentially applied to encrypt the data byte by each virtual cryptor machine instance. The manner in which cryptors are selected may also vary. A particular pseudo-random method used in certain embodiments of the invention is discussed in more detail below.

FIG. 3 illustrates a method M200 that can be used to decrypt a ciphertext message produced according to some embodiments of the invention. The ciphertext message is received at S210. The ciphertext message may be successfully decrypted only by a receiver using the same initialization parameters to create at S220 an identical session to that used to encrypt the original plaintext message. A set of M cryptors identical to the original set of M cryptors used to produce the ciphertext message is generated. In this method, however, a set of N inverse cryptors is also generated, each cryptor in the inverse cryptor set containing the unique monoalphabetic cipher that exactly reverses the effects of encryption by the corresponding cryptor for each character of the plaintext alphabet. The rotational positions of some or all M cryptors, as well as the monoalphabetic cipher contents of one or more of the M cryptors are then modified at S230 exactly as would have been done at S130 in FIG. 2. Corresponding modifications are also made to the inverse cryptors. At S240, a subset of cryptors having N members is selected from the set of M inverse cryptors. At S260, each of the N inverse cryptors is installed in the virtual inverse cryptor machine in the reverse of the order of selection with no rotational adjustment. At S260, each plaintext byte is decrypted by sequentially applying all N inverse cryptors in the virtual inverse cryptor machine in the order installed to decrypt the data byte, post-adjusting each intermediate result with the assigned rotational position of the inverse cryptor, thereby decrypting the ciphertext byte which is stored as the next plaintext byte at S270. At S280, a determination is made as to whether all of the ciphertext message bytes have been processed. If additional message bytes remain to be processed, the method returns to S230, a new machine state is established and actions S240-S280 are repeated. If, at S280, it is determined that all ciphertext bytes of the received message have been decrypted, the plaintext message is output at S290 and the method ends at S299.

Specific aspects of exemplary methods of the invention will now be discussed in more detail. To aid those of ordinary skill in the art to understand the present disclosure and the exemplary embodiments, the details of the methods will be described in the context of software implemented functions. The functions illustrated within the figures herein have been designed with a fundamental concern for simplicity and clarity. The actual design of an apparatus incorporating the stream cipher methods should employ extremely efficient implementation strategies, including such measures as conditional jump tables, inline-coding versus inefficient function calls, and machine level logic that exploits the use of 8-bit registers and shift-registers that automatically produce results in the range {0 . . . 255}, among many others.

Terminology used in the descriptions follows the conventions used in the PASCAL programming language. It should be noted that neither the illustrated functions nor any particular values used in the illustrations are to be interpreted as constraints upon the disclosed methods or devices for carrying out the purposes of the present invention.

GENERAL TERMINOLOGY

To eliminate ambiguity, certain terms used herein are explicitly defined as follows:

Array A group of entities arranged in a sequence associating each entity with an index, the first entry always having an index of zero.

Byte A single entity of eight consecutive binary bits, numbered $\{7 \ldots 0\}$ in which the left-most bit is the high-order bit, ($2^7$) and the right-most bit is the low order bit ($2^0$), having a range of values [0 . . . 255].

Integer A single entity of 32 consecutive binary bits, numbered $\{31 \ldots 0\}$ in which the left-most bit is the high-order bit, ($2^{31}$) and the right-most bit is the low order bit ($2^0$), having a range of values [0 . . . 4,294,967,295].

Plaintext Byte(s) to be encrypted by the invention.

Ciphertext Byte(s) generated by the invention by encrypting plaintext.

CipherKey$^N$ An array of N bytes containing each value in the range [0 . . . (N−1)] exactly once in no specific order, constituting a monoalphabetic cipher.

Cryptor A dynamic, polymorphic CipherKey$^{256}$.

Morphing The modification of a CipherKey$^N$ achieved by swapping pairs of bytes, changing the location of byte values within the monoalphabetic cipher contents in a manner that yields a valid CipherKey$^N$.

Stream Cipher An algorithm that directly encrypts bytes of plaintext into ciphertext and decrypts bytes of ciphertext into plaintext or that may be used to generate streams of pseudo-random byte values that may be used to encrypt plaintext and decrypt ciphertext.

Pascal Functions

For simplicity and consistency, basic constructs of the programming language PASCAL are used to illustrate embodiments of the invention disclosed herein. However, other programming languages and techniques may be used to produce exactly the same functionality, producing the same encryption or decryption results with similar efficiency. The following six symbols are used within these illustrations:

← Store operation
+ Arithmetic operator: addition
− Arithmetic operator: subtraction
^ Boolean operator: and
⊗ Boolean operator: exclusive-or
= Boolean Condition: equal to FIGS. 4-6 show the set of PASCAL language constructs used for the exemplary process descriptions disclosed herein. Specifically, FIG. 4 shows the basic construct of a CASE statement. In PASCAL, a CASE statement executes only the instructions within the braces { } for the identified Value(s) of Variable. A range of Values is optional, specified using the structure: V1 . . . V2, where V2 is greater than V1. No instructions are executed for any unspecified Value(s), and no duplicates are allowed within sets of Value(s).

FIG. 5 shows the basic construct of a FOR statement. The FOR statement repeatedly executes the instructions within the braces { } until the Variable has been assigned each consecutive value from [Low . . . High] using an increment of one.

FIG. 6 shows the basic construct of an IF . . . THEN statement. The IF . . . THEN statement executes the instructions within the braces { } if, and only if, the Boolean Condition is true.

The PASCAL statements and operators discussed above are used within function definitions, each of which describes whether or not the function is provided to EXTERNAL processes as well as providing the function name, any parameter(s) and parameter type(s), an optional LOCAL VARIABLES list, and the specific operations performed. The function name is underscored both for definition and reference. Any parameters or LOCAL VARIABLES are assigned a type (Array, Byte, or Integer) which is separated from the related variable name(s) by a colon (:), with multiple parameters of the same type separated by comma(s) and different parameter types separated by semicolons (;).

As an example, FIG. 7 illustrates a Calculate function, which is defined as a function that is not available to EXTERNAL processes, with four parameters including an integer output variable and three integer input parameters, has no LOCAL VARIABLES, and sets the output variable, Value, equal to the sum of the first two input values minus the third input value. This function may be referenced as follows:

Calculate(N,80,10,50)

This particular instance of the function call would result in the value of the variable N being set to 40. Note that constants used as parameters in function calls are passed as values (call by value), while variables are passed as address references, allowing functions to modify the variables (call by name).

EXTERNAL functions are available to EXTERNAL user processes as well as the INTERNAL processes. The function descriptions do not contain parameter checks that should be implemented to ensure that only well constructed parameters are submitted to the EXTERNAL functions, and that the stream cipher has been properly initialized before requests are accepted to encrypt or decrypt data. All INTERNAL functions defined herein assume that all parameters fall within expected limits and may be either constants (byte or integer) or variables of the expected type.

Internal State Variables

The methods of the invention involve the construction of a virtual stream cipher machine consisting of a set of variables that are referred to herein as the machine's internal state variables and are referenced throughout the illustrative functions that specify the initialization, encryption, and decryption processes. The internal state variables are italicized when referenced herein.

| CryptorTable | Array of 256 cryptors |
| InverseTable | Array of 256 cryptors |
| Inc | Byte |
| IndexLo | Byte |
| IndexHi | Byte |
| X | Byte |
| Y | Byte |
| Z | Byte |

During repeated sequences of encryption/decryption iterations, an exemplary embodiment of the stream cipher of the invention continually and unpredictably modifies the monoalphabetic cipher contents of all cryptors selectively using either of two innovative morphing strategies. The dynamic qualities of the cryptors within the CryptorTable therefore provide ideal sources of constantly varying sequences of values that may be produced by sequentially stepping index values through different cycles, each cycle producing index references to each of the 65,536 bytes contained within all 256 cryptors in the CryptorTable. This illustrates only one of many alternative concepts developed and tested to exploit such sequences. The exemplary embodiment of the invention introduces two internal state byte variables, IndexLo and IndexHi, which are variably stepped and used in combination to reference each unique index location within the CryptorTable for each full cycle of 65,536 iterations. These stepping sequences are driven by the variable, Inc, which is stepped through all odd values [1, 3 ..., 253, 255]. This strategy generates 128 different cycles, each full cycle producing a different sequence of the possible 65,536 unique index references. Every value in the CryptorTable changes location during each cycle, dramatically impacting the resulting sequences of values that would be produced if the cycle were repeated, which only occurs after a total of 8,388,608 steppings.

For each encryption iteration, IndexLo is variably stepped by adding Inc, assuring that each value {0 ... 255} occurs in IndexLo exactly once for every 256 steppings. After each full cycle of IndexLo, IndexHi is stepped by subtracting Inc, assuring that each value {0 ... 255} also occurs in IndexHi exactly once for every 256 steppings. After each full cycle of IndexHi, the value of Inc is stepped by two until reaching the value 255, whereupon Inc is reset to 1.

Process Description

The detailed technical description of the exemplary embodiment of the stream cipher of the invention is presented in four separate sections:
State Modification Functions
Encryption Function
Decryption Function
Initialization Functions The initialization of the stream cipher must be performed first to generate the initial internal states. However, the functional descriptions are presented as listed above in order to define each function before it is referenced by other functions.

State Modification Functions

The four exemplary INTERNAL functions, illustrated in FIGS. 8-11, may be used during initialization to generate all internal state variables of the exemplary embodiment of the stream cipher, and used subsequently to selectively modify one or more internal state variables prior to encrypting (decrypting) each plaintext (ciphertext) input byte. The first three of these functions are called upon by other functions either to modify an existing cryptor (SwapAll function), to generate a new cryptor (BuildCryptor function), or to construct an inverse cryptor (BuildInverse function). All three functions produce a cryptor containing a valid monoalphabetic cipher.

The present disclosure introduces only two of many alternative morphing strategies that have been designed, implemented and evaluated by the inventor, some of which progressively but unpredictably swap only single pairs of bytes within selected cryptors, and others that use a variable number of selected cryptors to entirely regenerate the monoalphabetic cipher contents of new cryptors. Obviously, replacing even a single cryptor in the CryptorTable using either of these methods considerably alters the potential results of all subsequent encrypting and morphing processes.

The first exemplary morphing strategy, illustrated by the SwapAll function (FIG. 8), accepts a Method value and a Guide cryptor as inputs which are used to generate 128 pairs of unique values used to swap the entries within the Target cryptor. Each of the possible 256 different Method values {0 ... 255} produces a different sequence of 128 byte-pairs, every byte value occurring exactly once in each sequence. Since any of the 256 cryptors may have its entire monoalphabetic cipher contents altered in a manner that produces any one of 65,536 different cryptors, any one of a potential 16,777,216 alternative cryptors may be generated and introduced as a replacement within the CryptorTable at any given instance by the SwapAll function.

Similarly, a second exemplary morphing strategy, illustrated by the BuildCryptor function (FIG. 9), initially constructs and stores a cryptor in the local cryptor, Temp, protecting the contents of both input cryptors from corruption during the process. Ordering of the contents of the new cryptor, Temp, is determined by the input cryptor, First. The values stored into Temp are determined by the contents of the input cryptor, Second, whose sequence of values are effectively scrambled by combining the input value, Factor, with the local index variable, B, using the Boolean exclusive-or operation. The cryptor in the CryptorTable at the Entry index is then replaced by the cryptor in Temp. Any two of the 256 cryptors in the CryptorTable may be used as inputs, combined with any of the possible 256 different Factor values {0 ... 255}. Thus, the generated cryptor produced by this "factored multiplication" may be any one of the 16,777,216 possible alternatives at any given instance. Further, the newly generated cryptor may be used to replace any one of the cryptors in the CryptorTable as specified by the value, Entry, which introduces another factor of 256 possibilities offered by this second morphing strategy, yielding a total of 4,294,967,296 different possible results affecting the contents of the CryptorTable.

The exemplary BuildInverse function (FIG. 10) constructs a cryptor in the InverseTable which contains the unique monoalphabetic cipher that is the exact inverse of the corresponding cryptor in the CryptorTable, for any given index, Entry.

The exemplary ShiftStates function (FIG. 11) selectively modifies the set of internal state variables of the stream cipher prior to the encryption of each plaintext byte in a pseudo-random manner that ensures that generated ciphertext is unpredictable and essentially aperiodic. The ShiftStates function variably combines the internal state byte variables IndexLo and IndexHi to produce indexes used to select values within the large plurality of cryptors in the CryptorTable to direct its tasks. These two state byte variables are variably stepped by adding/subtracting the internal state byte, Inc. After each stepping of IndexHi, the corresponding cryptor in the CryptorTable is totally modified by a pseudo-random morphing using the SwapAll function, the supplied Guide cryptor and Method value being derived from pseudo-random residue values retained from the previous process operations in the internal state byte variables X, and Y. Thus, for each full cycle of IndexHi, the ShiftStates function will have altered all 256 cryptors in the CryptorTable so dramatically that every unique byte value within every cryptor has been shifted to a different location. After each stepping of Inc, two adjacent cryptors in the CryptorTable specified by the new value in Inc are completely replaced by cryptors built by the BuildCryptor function, again supplying all input parameters deriving from pseudo-random residue values retained from the previous process operations in the internal state byte variables X, Y, and Z. After each full cycle of Inc, every cryptor in the CryptorTable has been replaced in this manner.

The actions of the ShiftStates function may also pseudo-randomly affect the rotational position of all cryptors, logically assigning a new position to each cryptor in the CryptorTable (and its corresponding inverse cryptor) for each process iteration.

For simplicity, the exemplary ShiftStates function performs the same tasks for sessions created for both encryption and decryption, although the inverse cryptors do not affect encryption results. Therefore, it is possible to construct a separate, more efficient ShiftStates function for encryption-only sessions since the inverse cryptors need not be maintained.

Encryption Process

The Encryption Process performs the task of generating ciphertext byte(s) by encrypting plaintext byte(s) submitted by a calling process to the Encrypt function (FIG. 12). For each byte encrypted, the ShiftStates function is first executed to alter the current internal states of the machine including values which determine the rotational position of all cryptors. Using the modified internal state variables, the exemplary Encrypt function then pseudo-randomly selects an ordered set of 5 cryptors from the CryptorTable to logically construct a virtual cryptor machine instance. The Encrypt function uses three independently selected cryptors to direct the process, copying them to the LOCAL VARIABLES Guide, Mask, and Positions in order to simplify and clarify the illustrated instructions. This logic ensures that every CryptorTable entry is used exactly once as a Guide for each stepping of IndexHi, which is also used as the index from which contiguous entries are selected from within the Guide as initial candidates. Each of these 5 initial candidates is then modified using the LOCAL VARIABLE Mask, a different cryptor that unpredictably alters the set of 5 different cryptors that will be used. The monoalphabetic cipher contents of the LOCAL VARIABLE Positions affect the unique, initial rotational position of each of the 5 cryptors installed within the virtual cryptor machine. The resulting virtual cryptor machine instance is then used to encrypt the plaintext byte to produce the ciphertext byte by sequentially applying the 5 cryptors, pre-adjusting the rotational position of each cryptor with the corresponding value in Position combined with the value of IndexLo.

The exemplary logic ensures that whenever a cryptor is used as the Guide, exactly once for each stepping of IndexHi, the set of 5 initial candidate cryptors will be different from any set produced during the previous 255 occasions that the same cryptor was used as the Guide. Further, every cryptor is completely changed at least once for each full cycle of IndexHi. After 256 occasions in which a cryptor has been used as the Guide, that cryptor will have been utterly modified by at least one of the two exemplary morphing strategies. The pseudorandomly selected Mask cryptor further affects the selection of the 5 different cryptors actually used within each virtual cryptor machine instance.

Decryption Process

The Decryption Process performs the task of generating plaintext byte(s) by decrypting ciphertext byte(s) using a Decrypt function (FIG. 13), which exactly reverses the effects produced by the Encrypt function called in the same machine state. For each byte decrypted, the Decrypt function first calls upon the ShiftStates function (FIG. 11) to alter the current state of the machine, including the task of assigning a new set of values which initially specify the rotational position of each cryptor. Using the new internal state variables, the Decrypt function then uses the same logic as the Encrypt function to select the same Guide, Mask and Position cryptors. The identical ordered set of 5 different cryptor identities is then selected and the virtual inverse cryptor machine instance is constructed using the corresponding inverse cryptors located in the InverseTable. The virtual inverse cryptor machine instance then decrypts the ciphertext byte by sequentially applying the 5 inverse cryptors in the reverse order to that of the Encrypt function, appropriately post-adjusting the intermediate result from each inverse cryptor with the corresponding value in Position combined with the value of IndexLo, to produce the plaintext byte.

Initialization Process

Initialization Parameters

The Initialization Process creates a session for encrypting plaintext into ciphertext or decrypting ciphertext into plaintext. Decryption may be successfully performed by recreating the same session previously used to call upon the Encrypt function to encrypt the plaintext, and then calling upon the Decrypt function that reverses the encryption process using inverse cryptors to decrypt the ciphertext and exactly reproduce the plaintext. The Initialization Process is comprised of two phases which use a set of user-supplied parameters to generate an unpredictable set of cryptors in the CryptorTable.

Initialization parameters may be used by the invention to pseudo-randomly generate the initial values of all internal state variables, including an unpredictable initial set of cryptors. The following values for the initialization parameters are exemplary only, and may be larger or smaller than the values indicated below. The initialization parameters are italicized when referenced herein.

| | |
|---|---|
| BaseKeys | Array of 256 cryptors |
| PrivateKey | Array of 32 bytes (unique values in the range {0 . . . 255}) |
| SessionString | Array of 64 bytes |

The internal state variables are initialized using a publicly exchanged SessionString in combination with one or more shared-secret parameters, such as PrivateKey and BaseKeys. The initialization parameter SessionString is logically a string of ciphertext bytes comprising detailed initialization instructions that must be properly decrypted using the shared-secret parameters to correctly interpret the directions to modify the internal state variables. The strategy presented by the initialization function, ApplySessionString (FIG. 15), is only one of many possible approaches that ensure that every single bit within the 512 bits (64 bytes) of this parameter dramatically and unpredictably affects the entire set of internal state variables. The impact of this parameter is made even more significant during the second phase of the initialization process (described below) which derives all parameters for the second phase from the results of the first phase.

The size of SessionString within this exemplary embodiment is set to be 64 bytes to illustrate the concept of concatenating document specific parameters, such as current date/time values, bank routing and account numbers, unique document numbers such as check numbers and amounts, a set of pseudo-randomly generated bytes, and possibly hash values generated by various message authentication strategies. This approach allows the creator of any encryption session to generate a unique SessionString that would generate an entirely different session created for similar or even identical documents—an important consideration that avoids introducing cryptanalysis vulnerabilities. Alternative SessionString sizes are practicable, but a minimum of 32 bytes is recommended.

Other initialization parameters may be used that allow a group of people to exchange information securely. For example, GroupKey, a shared-secret CipherKey$^{256}$, may be used in an alternative embodiment of the invention. GroupKey may be known only by a subset of the group of entities sharing BaseKeys and used to logically reorder the entries within BaseKeys.

Exemplary Initialization

The internal state variables may be initialized using a publicly exchanged SessionString of 64 bytes in combination with a PrivateKey, known only by the sender and receiver, having the minimum recommended size of 32 bytes (64, 128, or 256, are feasible alternatives). The BaseKeys parameter may be a set of 256 monoalphabetic ciphers for the alphabet of 256 unique byte values {0 . . . 255}, and may be made public, or optionally treated as a second shared-secret known to only a group of entities. Other sizes and combinations of SessionString, PrivateKey, and sets of BaseKeys have been implemented and tested by the inventor, so the present invention is not limited to the exemplary parameter sizes.

An exemplary embodiment of the invention generates an initial set of 256 polymorphic cryptors whose continually varying values are repeatedly used to construct transitory instances of virtual cryptor machines employing five different cryptors, each virtual cryptor machine being used to encrypt only a single byte of plaintext, as explained below.

Initialization Process Functions

The tasks performed during the initialization process are directed by the NewSession function (FIG. 18) using the user supplied initialization parameters, SessionString, PrivateKey, and BaseKeys. The NewSession function employs a two-phase strategy that unpredictably alters every internal state variable, particularly the CryptorTable, given even a single-bit variation in either the SessionString or PrivateKey parameter. During the first phase, the NewSession function copies the user-supplied BaseKeys into the CryptorTable and executes the ApplyPrivateKey function (FIG. 14) which uses every value within the PrivateKey to direct repeated morphings of all cryptors in the CryptorTable, the results of previous morphings directly affecting subsequent results. A temporary copy of SessionString is then created and passed to the ApplySessionString function (FIG. 15) which repeatedly encrypts it, using the generated ciphertext to twice direct the morphing of every cryptor. The MorphAllCryptors function (FIG. 16) is then called which iteratively encrypts a copy of each cryptor in the CryptorTable, also using the generated ciphertext to twice direct the morphing of every cryptor in the CryptorTable.

The NewSession function then calls upon the ModifySession function (FIG. 17) which performs the second phase by using the current machine state in combination with the temporary copy of the SessionString parameter that was repeatedly encrypted during the first phase to totally reconstruct the entire CryptorTable, influenced by the parameter, Order (a CipherKey$^{256}$). The ModifySession function then calls upon the ApplyPrivateKey, ApplySessionString and MorphAllCryptors functions to repeat their tasks. ModifySession generates the final initialization state by iteratively calling upon the BuildInverse function (FIG. 10) to create the InverseTable containing the corresponding inverse cryptor of each cryptor in the CryptorTable. The ModifySession function reinitializes all internal state variables, including the CryptorTable, using the previous internal states in combination with its parameters, generating an entirely new machine state. This EXTERNAL function therefore allows a user to create a secondary encryption session that is irrevocably linked to the previous session, a significant protocol strategy tool.

Exemplary Initialization Protocols

In an exemplary communication protocol using the stream cipher methods of the present invention, a message sender initializes a stream cipher session using a specific set of the initialization parameters, constructing a virtual stream cipher machine that may be used to encrypt practicably unlimited amounts of digital data that may be sent as a series of ciphertext messages to a distant receiver. The authorized receiver of the ciphertext messages, privy to all parameters used to initialize the sender's session, is able to initialize the same stream cipher session which may be used to decrypt the received ciphertext messages into plaintext.

More advanced protocols may adopt the practice of creating two separate stream cipher sessions to support communications. A primary session is created by each party as described above using a shared-secret PrivateKey and a publicly exchanged SessionString. A secondary encryption session is then also created by each party using pseudo-randomly generated PrivateKey and SessionString parameters. These parameters, encrypted using the primary session, may be securely exchanged by two cooperating parties over any public communications network, allowing both parties to create two identical secondary sessions. Each party uses their own secondary session to encrypt plaintext data into ciphertext before transmitting it to the second party. This approach ensures that no stream cipher session created using the shared-secret PrivateKey in combination with a publicly exchanged SessionString is ever used to encrypt any plaintext data subject to frequency analysis based cryptanalysis attacks. The pseudo-randomly generated parameters used to create the secondary sessions are totally transitory, never to be used again.

Similarly, such secondary stream cipher sessions could be used by anyone with a PrivateKey to encrypt and decrypt data written to disk. Each encrypted file could contain a header record that provides the encrypted PrivateKey and SessionString used to create the secondary session, as well as the unencrypted SessionString used with the PrivateKey to initialize the primary session that was used to encrypt the secondary PrivateKey and SessionString.

Processing System Description

The encryption/decryption processes of the invention allow one or more parties to communicate securely through various communication and transmission systems, or for any single party to protect data within a file storage system. The methods of the invention may be implemented on any digital data processor. Embodiments of the invention may be programmed or otherwise embodied in software configured for execution on a data processor. Such software may be stored in the data processor and/or any suitable non-transitory storage medium. Embodiments of the stream cipher of the invention may also be implemented as a hardware device, an application specific integrated circuit, or chip, which may reside on a hand-held communications device such as a cell phone or wireless network card.

Figure 19:
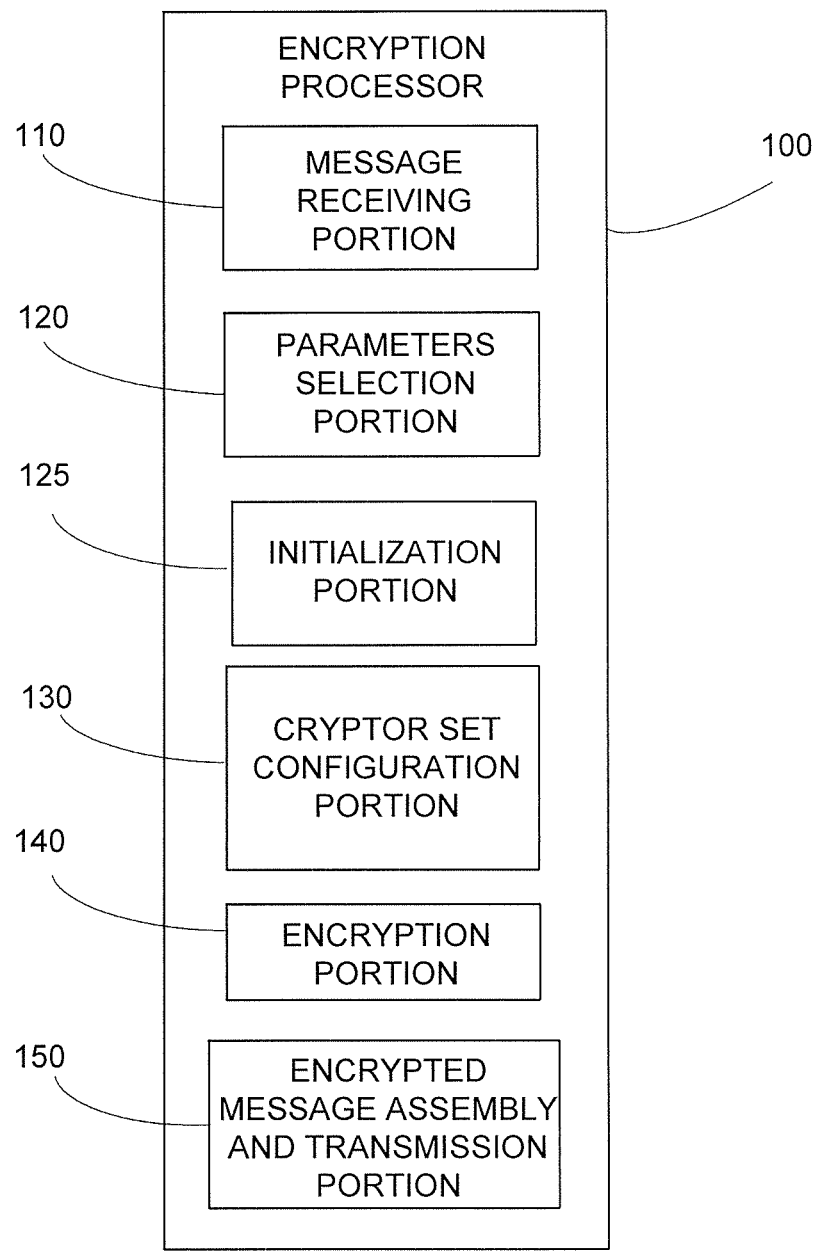
FIG. 19 is a schematic illustration of an encryption processor according to an embodiment of the invention.

An exemplary encryption system according to an embodiment of the invention may incorporate an encryption processor 100 as shown in FIG. 19. The encryption processor 100 is configured for encrypting a plain text message into ciphertext using any of the methods of the invention, including, for example, the general method depicted in FIG. 2. The processing system 100 comprises a message receiving portion 110, which may include without limitation a user interface for receiving input and instructions directly from a user, one or more interfaces with other portions of the processor 100 and/or other processors or processing systems, an interface with one or more local or wide area networks, and/or an interface with a telecommunications network. The message receiving portion 110 is configured for receiving a message for encryption processing and any accompanying information or instructions via any of the above input sources.

The processor 100 further comprises a parameters selection portion 120 configured to generate or receive a set of initialization parameters for use in establishing an encryption session. The parameters selection portion 120 may be configured to generate the initialization parameters based on a sessionstring and/or secret-key information provided by a session initiator or from other information accompanying the message to be encrypted and/or previous key information stored in a database or separately provided by a user. The parameters selection portion 120 passes the initialization parameters to an initialization portion 125 configured to initialize the state variables for an encryption instance. The initialization portion 125 may be configured to carry out any initialization process, including the methodology described above.

The processor 100 also comprises a cryptor set configuration portion 130 adapted to construct a set of M cryptors based on the state variables of the system. The cryptor set configuration portion 130 may also be configured to modify the cryptor set during the encryption of a message according to the methods described herein. The functions of the initialization portion 125 and cryptor set configuration portion 130 may be carried out by a single initialization and cryptor set configuration portion (not shown). The encryption portion 140 of the processor 100 is adapted to select a subset of the cryptor set constructed by the cryptor set configuration portion 130 and sequentially apply them to encrypt a single plaintext message byte. The basis for selection of this subset may be varied according to the methods described herein.

The cryptor set configuration portion 130 may also be configured to construct a set of M inverse cryptors, each of the inverse cryptors being the inverse of a corresponding one of the set of M cryptors. Further, the encryption portion 140 may be configured to apply the inverse cryptors to process previously encrypted message bytes as discussed above.

The encrypted message assembly and transmission portion 150 may be adapted to assemble the ciphertext message and transmit or otherwise output the message. The encrypted message assembly and transmission portion 150 may include an interface to any of the input-output sources described above in conjunction with the message receiving portion 110.

It will be understood that the message receiving portion 110, parameters selection portion 120, initialization portion 125, cryptor set configuration portion 130, encryption portion 140 and encrypted message assembly and transmission portion 150 may be distributed among one or more data processors or data processing systems. All of these elements may for example be provided on a single user data processor. Alternatively, the various components of the encryption processor 100 may be distributed among a plurality of data processors in selective communication via a network.

It will also be understood that the actions of any of the methods described herein may be embodied in instructions stored on a computer-readable storage medium for use in conjunction with a programmable data processor.

Figure 20:
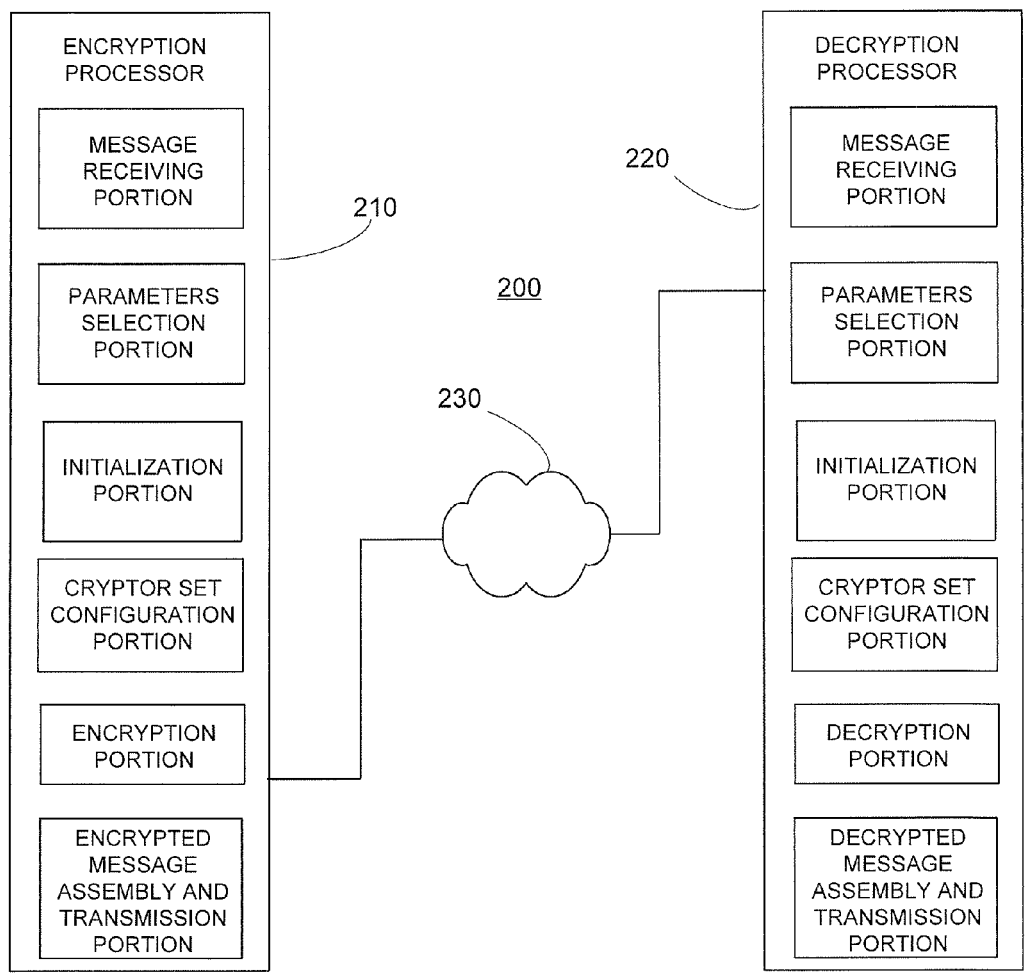
FIG. 20 is a schematic illustration of a cryptographic system according to an embodiment of the invention.

FIG. 20 illustrates a cryptographic system 200 having an encryption processor 210 and decryption processor 220 that may be in selective communication over a network 230. Each of the processors 210, 220 are configured as described above for the processor 100 of FIG. 19 except that the processor 220 has decryption and decrypted message assembly and transmission portions rather than encryption and encrypted message assembly and transmission portions. It will be understood that either processor may have portions configured for both encryption and decryption. The network 230 may be the Internet or any other computer network or any form of telecommunications network. The encryption and decryption processors may each be any form of data processor programmable for implementing one or more of the methods of the invention. One or both of the processors 210, 220 may, for example, be or include any form of computer, programmable telecommunications device (e.g., a smart phone, smart pad, or smart card).

Additional Embodiments

Varying the Methods and/or Parameters Used by the Initialization Process

The number of possible alternative strategies, and combinations of strategies, which may be used to generate the initial internal states of the stream cipher of the present invention is practically unlimited. Many alternative embodiments using a multitude of different strategies and combinations of strategies have been developed and successfully tested. The exemplary Initialization Process illustrates methods that may be used in combination to generate the monoalphabetic contents of the large plurality of cryptors in a manner which ensures that even minor changes anywhere within the suite of input parameters unpredictably impact every cryptor. In particular, as illustrated in the exemplary embodiment, the reapplication of the methods during the second phase magnifies the impact of a single bit variation in any parameter such that wholesale changes are produced in all cryptors. It should be noted that the exemplary embodiment illustrates methods which ensure that all such changes within the Initialization Process impact only the initial internal state variables of the stream cipher of the invention, and are transparent to methods subsequently employed during encryption and decryption processes.

As previously discussed, additional initialization parameters, or different sized initialization parameters, may be introduced in alternative embodiments. Other alternative embodiments increase or decrease the number of cryptors initially supplied to perform initialization, and others vary the size of the shared-secret private keys.

Another embodiment accepts an additional initialization input parameter, a shared-secret cryptor whose values may be used to reorder the large plurality of cryptors before, during, and/or after other methods are used to scramble their monoalphabetic contents. The impact of this parameter is magnified by the fact that the initialization methods used during the Initialization Process are not associative. Even minor changes in the order of the large plurality of cryptors before initialization, such as swapping the locations of two cryptors, cause wholesale changes to the monoalphabetic contents subsequently produced by the methods. The introduction of this parameter allows the creation of stream cipher sessions using a publicly exchanged private key, permitting groups whose members all know the shared-secret "group key" to communicate securely. As described elsewhere, a protocol should be employed that ensures that such sessions are used only to protect the exchange of pseudo-random values required to create secondary sessions.

Varying the Methods Used by the State Modification Process

The number of possible alternative strategies, and combinations of strategies, which may be used to selectively modify the internal states of the stream cipher of the present invention is also practically unlimited. Dozens of methods have been developed and tested within alternative embodiments which use such strategies to pseudo-randomly modify the contents of the polymorphic chamber containing the large plurality of cryptors, using the resulting values to generate sequences of unpredictable values to direct subsequent modifications. The methods employed within such embodiments include the use of progressive and/or pseudo-random processes which selectively call upon one or more such methods prior to each process iteration. A progressive process may be controlled by values produced using separate index variables to gradually step through sequences to modify the entire contents of every cryptor. A pseudo-random process may be controlled by using residue values from the previous process iteration, or sequences of values produced by irregularly stepping additional index variables, or a combination of both, to selectively exchange pairs of values within a cryptor.

Examples of these methods, any of which may be unpredictably structured and/or applied, include:
- altering index values controlling stepping sequences
- altering the rotational position value of one or more cryptors
- altering the locations of all cryptors and their inverse cryptors
- swapping one (or more) pairs of locations within selected cryptors and making appropriate changes to the corresponding inverse cryptor
- swapping locations of two cryptors (and the corresponding inverse cryptors)
- swapping a cryptor with its inverse cryptor
- generating new cryptors using more than two cryptors to affect results Varying the Actions Performed by the Virtual Cryptor Machines The logical application of a virtual cryptor in a given rotational position to encrypt an input byte may be varied by using any one of dozens of different strategies, each strategy producing different encryption results when applied to the entire plaintext alphabet. In the exemplary embodiment, the byte value logically specifying the rotational position of a cryptor is combined with the value of the input byte to be encrypted using addition, modulo 256. The resultant value is used as an index into the virtual cryptor array to obtain a value within the current monoalphabetic cipher to replace the input byte. This strategy simulates application of each rotor as applied within the prior-art electro-mechanical rotor machines. However, in a virtual machine, dozens of different strategies might be employed that variably combine the rotational position and input byte values either before or after (perhaps, even without) using the cryptor.

Strategies have been developed and successfully tested in alternative embodiments that use varying operators to combine the data value and rotational cryptor position prior to indexing into each cryptor, other strategies first index into a cryptor with one of the two values and then variably use different operators (e.g. subtraction, addition, Boolean exclusive-or) to combine the resultant value with the other of the two values. Still other embodiments might variably use pseudo-random internal state variables such as X, Y, or Z, either as a substitute for the cryptor position or to alter its position, or even on occasion to operate directly upon the data value (perhaps in combination with the cryptor position value) using a Boolean exclusive-or without actually using the cryptor itself.

Many other embodiments of the stream cipher of the invention have also been developed and successfully tested that employ one or more additional values which may be used to vary the number of cryptors applied by different virtual cryptor machine instances. Each of these strategies dramatically increases the number of different possible monoalphabetic ciphers that may be produced to encrypt each input data byte. Such values may be pseudo-randomly generated within each process iteration by variably combining residual values retained from the previous process iteration in the internal state variables X, Y, and Z. For example, the number of cryptors actually applied by each virtual cryptor machine instance may be varied, within a limited range of values. Thus, rather than each cryptor machine instance applying a fixed number of cryptors as illustrated in the exemplary embodiments above, pseudo-randomly varying the number of cryptors within the range {3 . . . 7}, would result in an average of approximately 5 cryptors being applied for a large number of process iterations. This innovation alone, appearing simple in concept, introduces additional significant challenges to any cryptanalysis strategies.

Another embodiment may pseudo-randomly specify one or more individual cryptors within the large plurality (or one or more positions within each virtual cryptor machine) that logically would be skipped during the sequential application of cryptors within a process iteration. This strategy further unpredictably varies the number of cryptors actually applied to encrypt each plaintext byte. Similarly, another embodiment strategy is to pseudo-randomly specify one or more individual cryptors within the large plurality (or one or more positions within each virtual cryptor machine) which, if applied within the cryptor machine instance, would be immediately applied again to re-encrypt the previous result. Further, such a second application of a cryptor could optionally be performed with, or without, using the rotational position of the cryptor to influence results. Another approach may be to use the result of the second application not simply to produce the new encrypted value as usual, but to use the results to modify the previous results by addition, subtraction, or the Boolean exclusive-or operation.

Similarly, another exemplary embodiment may use a pseudo-randomly generated value to specify an additional cryptor (or inverse cryptor) within the large plurality that may be applied before and/or after each cryptor machine instance completes its tasks. Another approach may be to use such a value to directly modify the input value (addition, subtraction, or Boolean exclusive-or) before and/or after each cryptor machine instance completes its tasks.

Many such strategies, and combinations of strategies, have been developed and tested but are not illustrated in the exemplary embodiment which is presented herein to illustrate the power and efficacy of the four major revolutionary concepts: the dynamic cryptor; the corresponding dynamic inverse cryptor; the polymorphic chamber of a large plurality of cryptors used to generate sequences of virtual cryptor machines; and the use of the swirling miasma of values created by the dynamic contents of the polymorphic chamber as a source of unpredictable sequences of pseudo-random values that may be used to drive associated methods and functions.

Varying the Encryption Method

In an alternate embodiment, the stream cipher methods of the invention may be configured as a "random number generator" that requires no digital information stream to encrypt and no separate decryption process. This embodiment of the stream cipher, using the same initialization methods, performs exactly as within the exemplary embodiment except that a "target" byte is pseudo-randomly selected and then encrypted by a virtual cryptor machine instance rather than the input data byte of the exemplary embodiment. Called repeatedly, or using parameters that indicate the length and an address to store a sequence, a stream of encrypted target bytes is pseudo-randomly generated that may be used by other processes. For example, such a stream of values may be combined with a corresponding stream of plaintext message bytes using the Boolean exclusive-or operator, producing a stream of ciphertext bytes. A message encrypted using this approach may be decrypted simply by using the same initialization parameters to generate the identical sequence of encrypted target bytes, and using the Boolean exclusive-or operator to combine each byte of the encrypted ciphertext message with the corresponding byte of stream of encrypted target bytes, exactly reproducing the plaintext message.

A major advantage of such a random number generator based upon the stream cipher methods of the present invention is that the set of initialization parameters used to generate the initial internal machine states for any session may be entirely generated from a previous session. Such a "feedback" approach would be extremely effective as a method to generate unpredictable sequences of values for purposes other than encryption that do not require that the sequences be reproduced.

To those skilled in the art of cryptography, it is understood that methods using a random number generator with such a "combining strategy" is subject to "known plaintext" attacks which allow an unauthorized recipient to intercept and strip away the known plaintext of a message, thereby obtaining the stream of generated values. The attacker is then able to effectively "forge" a message using a substitute plaintext message of the same length, appropriately combining it with the revealed stream of generated values such that any authorized recipient who decrypts the changed ciphertext will obtain the plaintext of the forged message, and would be unaware of the substitution. Substitution stream ciphers are not subject to such known plaintext attacks correctly modifying intercepted ciphertext. However, such attacks have proved effective in generating valuable cryptanalysis statistics whenever stream ciphers have been used to encrypt multiple messages of known plaintext using the same (or even similar) internal states. However, with proper initialization protocols, the internal states of the stream cipher of the present invention will always vary so dramatically from session to session that it is extremely unlikely that the set cryptors of two different sessions will ever contain even one identical monoalphabetic cipher after initialization.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

While the foregoing illustrates and describes exemplary embodiments of this invention, it is to be understood that the invention is not limited to the construction disclosed herein. The invention can be embodied in other specific forms without departing from the spirit or essential attributes.

What is claimed is:

1. A method for processing using a data processor a digital information set having a plurality of information bytes, the method comprising:
   determining a set of initialization parameters;
   initializing a set of state variables using the set of initialization parameters;
   generating a plurality of cryptors, each cryptor being a virtual dynamic array containing a monoalphabetic cipher and having an associated index value representing a rotational position of the cryptor;
   modifying the state variables and one or more of the plurality of cryptors;
   setting the index value for each cryptor in the plurality of cryptors;
   selecting an ordered cryptor subset to be applied to an information byte;
   processing a selected one of the plurality of information bytes using the ordered cryptor subset to produce a processed information byte;
   repeating the actions of modifying, setting, selecting, and processing for each remaining information byte of the information set, each performance cycle of the actions of modifying, setting, selecting, and processing constituting a process iteration; and
   assembling the processed information bytes from all process iterations to form an output information set.

2. A method according to claim 1,
   wherein the information bytes are plaintext bytes or ciphertext bytes produced from plaintext bytes, and
   wherein if the information bytes are plaintext bytes, then each processed information byte is a ciphertext byte and if the information bytes are ciphertext bytes, then each processed information byte is a plaintext byte.

3. A method according to claim 1 wherein the action of processing a selected one of the plurality of information bytes includes:
   sequentially applying each cryptor in the ordered cryptor subset to an input byte, the input byte for a first cryptor application being the selected one of the plurality of information bytes and for each subsequent cryptor application, the input byte being a resultant output byte from the preceding cryptor application, the processed information byte being the output byte from a final cryptor application.

4. A method according to claim 3 wherein the action of applying each cryptor includes:
   combining the input byte with the index value associated with the cryptor being applied to create an intermediate output byte, and
   using the intermediate output byte as an index into the cryptor virtual array to obtain the output byte for the cryptor application.

5. A method according to claim 4 wherein the action of combining the input byte with the index value associated with the cryptor includes at least one of the set consisting of
   adding the input byte and the index value,
   applying a Boolean exclusive-or operator to the input byte and the index value, and subtracting the index value from the input byte.

6. A method according to claim 3 wherein the action of applying each cryptor includes:
   using the input byte as an index into the cryptor virtual array to obtain an intermediate output byte, and
   combining the intermediate output byte with the index value associated with the cryptor being applied to produce the output byte for the cryptor application.

7. A method according to claim 1 further comprising:
   generating a plurality of inverse cryptors equal in number to the plurality of cryptors, each inverse cryptor containing a unique monoalphabetic cipher that reverses an encryption effect of a corresponding one of the plurality of cryptors and having the same associated index value as the corresponding one of the plurality of cryptors.

8. A method according to claim 7 wherein the information set is a ciphertext message comprising information bytes that are each ciphertext bytes, the ciphertext message being a result of a previous encryption of a plaintext message based oil the initialization parameters and the output information set being a reproduced version of the plaintext message, and wherein the action of processing a selected one of the plurality of information bytes includes:
   sequentially applying, in reverse order, the inverse cryptor corresponding with each cryptor in the ordered cryptor subset to an input byte, the input byte for a first inverse cryptor application being the selected one of the plurality of information bytes and for each subsequent inverse cryptor application, the input byte being a resultant output byte from the preceding inverse cryptor application, the processed information byte being the output byte from a final inverse cryptor application.

9. A method, according to claim 8 wherein the action of applying the inverse cryptor corresponding with each cryptor includes:
using the input byte as an index into the inverse cryptor virtual array to obtain an intermediate output byte, and
combining the intermediate output byte with the index value associated with the inverse cryptor being applied to produce the output byte for the inverse cryptor application.

10. A method according to claim 9 wherein the action of combining the intermediate output byte with the index value associated with the inverse cryptor being applied includes at least one of the set consisting of
adding the index value to the intermediate output byte,
using a Boolean exclusive-or operator to apply the index value to the intermediate output byte, and
subtracting the index value from the intermediate output.

11. A method according to claim 1 wherein the action, of processing a selected one of the plurality of information bytes includes:
determining a pseudo-random target information byte;
sequentially applying each rotationally positioned cryptor in the ordered cryptor subset to the target information byte to produce a processed target byte; and
combining the processed target byte with the selected one of the plurality of information bytes to produce the processed information byte.

12. A method according to claim 1 wherein the action of initializing includes:
constructing the set of state variables using values derived from a public information string and one or more private information strings.

13. A method according to claim 1 further comprising:
changing the number of cryptors in the ordered cryptor subset during one or more of the process iterations.

14. A method according to claim 1 wherein the action of modifying one or more of the plurality of cryptors includes at least one modification selected from the set consisting of
altering the contents of one or more of the plurality of cryptors,
replacing one or more of the plurality of cryptors,
swapping locations of one or more pairs of values within cryptors of the plurality of cryptors, and
stepping one or more index variables that affect subsequent process iterations.

15. A method according to claim 1 wherein the action of selecting an ordered cryptor subset from the plurality of cryptors includes:
pseudo-randomly selecting the cryptors of the ordered cryptor subset from the plurality of cryptors based on one or more of the state variables.

16. A method according to claim 1 wherein the action of processing a selected one of the plurality of information bytes includes
pseudo-randomly generating a target byte,
sequentially applying each cryptor in the ordered cryptor subset to an input byte, the input byte for a first cryptor application being the selected target byte and for each subsequent cryptor application, the input byte being a resultant output byte from the preceding cryptor application, the output byte from a final cryptor application being the processed information byte.

17. A method according to claim 16 wherein the action of combining the processed target byte with the selected one of the plurality of information bytes includes at least one of the set consisting of
adding the processed target byte and the selected one of the plurality of information bytes,
applying a Boolean exclusive-or operator to apply the processed target byte to the selected one of the plurality of information bytes, and
subtracting the selected one of the plurality of information bytes from the processed target byte.

* * * * *